United States Patent [19]
Huttner

[11] 3,804,141
[45] Apr. 16, 1974

[54] TIRES FOR AUTOMOBILES AND LIKE VEHICLES

[76] Inventor: Franz Huttner, Zobelsreutherstr. 36, 8670 Hof, Germany

[22] Filed: May 4, 1972

[21] Appl. No.: 250,327

[30] Foreign Application Priority Data
May 4, 1971  Germany............................ 2122009

[52] U.S. Cl................................ 152/208, 152/226
[51] Int. Cl.............................................. B60c 27/02
[58] Field of Search............ 152/208, 225, 226, 211

[56] References Cited
UNITED STATES PATENTS
3,120,255  2/1964  Coppola............................. 152/208
3,683,990  9/1972  Detwiler............................. 152/225

*Primary Examiner*—James B. Marbert
*Attorney, Agent, or Firm*—G. B. Felshin

[57] ABSTRACT

The invention concerns improved tire structures, in particular for use with automobiles and the like. The tire is equipped with non-skid or antislipping means, which are regulatable in their position relative to the tire surface and if desired, may be locked and maintained in their operative location until they are released therefrom. A manipulation of predetermined non-skid element or elements may be had, so that the latter are gradually brought into different effective location or locations relative to the tire surface and afford the desirable anti-slipping result commensurate with the prevailing conditions of the road, autobahns and the like, as well as in accordance with the feel and own volition of the driver. Bowden or other mechanical, electrical or pneumatic power transmission means are employable to regulate, adjust, lock or release the skid elements by the driver from within the vehicle and during vehicular traffic.

18 Claims, 11 Drawing Figures

PATENTED APR 16 1974        3,804,141

Fig. 7
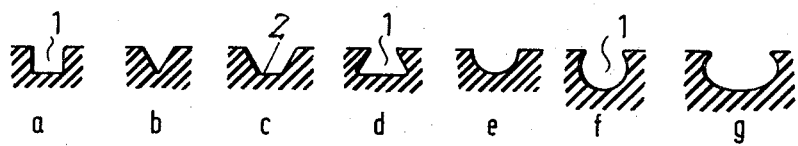
a b c d e f g
Fig. 8
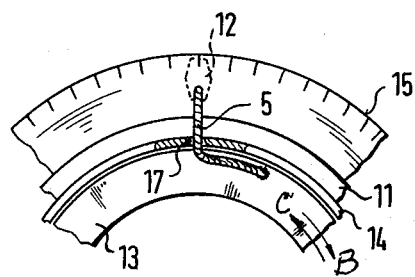
Fig. 9 Fig. 10
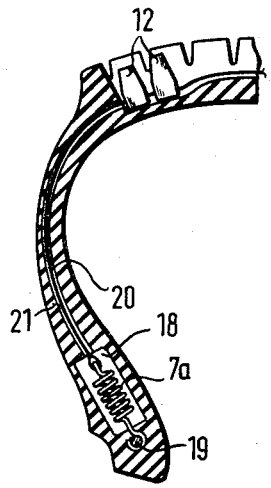 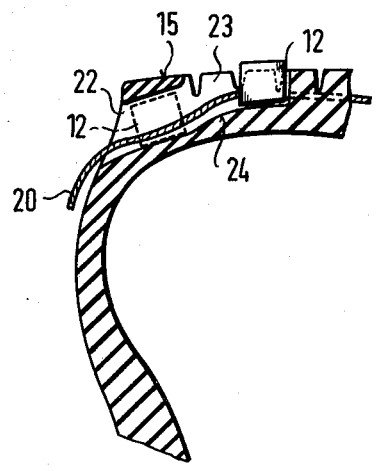

TIRES FOR AUTOMOBILES AND LIKE VEHICLES

BACKGROUND OF THE INVENTION

Non-skid devices are known in many and various forms. Most popular are at present spike-equipped tires. Into the tire threads are inserted and affixed thereto steel or metal pins, which are yieldably enclosed in sockets or holders. Such steel pins reduce to a certain degree the risk of skidding on wet or slippery road bed structures. A considerable disadvantage results from such non-skid devices in that these spikes become also effective on dry and only wet roads and cause easily damage to the road surface.

Other devices employed for antislipping purposes consist, for example, of interchangeable chain structures, which are applied to tire surfaces. Gripping and wearing pieces are added or applied to such non-skid chains. They carry a kind of wearing rings rotatably retained in the running direction of the tire (DAS 1.205.859). These and other solutions are, however, unsuitable to encounter the problem, namely, to be able to drive with the use the tire at about normal speed and without damaging the roads of various inherent conditions.

Still other non-skid devices for tire structures work with pressure variations in the tire. Into the grooves of a commercial automobile tire are inserted one or several non-skid rings, which are individually mounted and rigidly or loosely joined to each other (DAS 1.023.449). Such structures make it imperative that they require, however, repeated and continual mounting operations, which are uneconimical and render too many inconveniences for the driver or operator.

SUMMARY OF THE TECHNICAL DISCLOSURE OF THE INVENTION

The present invention, which deals especially with non-skid structures for tires, avoids the above-named and many other drawbacks and disadvantages. The invention provides therefore means affording a highly efficacious build-up of a tire of the non-skid type which does not necessitate any mounting and disassembling of tire accessories to bring about effectiveness and ineffectuality of the non-skid tire and resulting rather in means under the influence of the driver to operate non-skid means in dependence on his own volition which is influenced by his skill and prevailing conditions which are often subject to a variety of changes during driving operation.

It is another important object of the present invention to provide means facilitating the action of engagement with and disengagement from the road surface of new non-skid structures for tires to a regulatable degree.

A further object of the invention resides in the provision of means effectuating and determining with great advantage and in advance a non-skid tire operation in a quasi routine manner and substantially in accordance with the fuel of the driver.

Still another object of the invention is to provide means conducive to a simplified and practical antislipping structure which may be even embodied under certain circumstances in existing tire constructions to greatly improve their efficiency and usefulness (e.g., to prevent car rollback during parking).

According to the present invention, a non-skid device is comtemplated which can be rendered operative or inoperative without requiring any mounting or dismounting of the tire. This creates for the driver convenient means for connecting or disconnecting the non-skid device, as needed.

One of the problems pursuant to the invention may be solved in a way that guide grooves are arranged or cut in the automobile and like tire and at least one non-skid carrier member becomes associated with selected guide groove or grooves in such a way that this non-skid member can be displaced individually into and out of engagement position. The guide grooves are preferably oriented in axial direction. Any other direction, e.g., to assume a certain angular position to the axial direction including up to a radial position appears possible. The guide grooves need not extend in straight lines or rectilinearly. For example, these grooves can first be axially aligned to each other and then extend further in some other direction, say, in an angle of 45° or the like. Any combination of orientation of the guide grooves may be arranged.

According to the invention it is understood under non-skid carrier member any device may be used having a supporting body, which carries non-skid means such as strengthened grooves, spikes, combinations thereof, as well as preselected compound material.

By engagement position it is understood according to the invention the position of the non-skid member or members in which they become supportingly and effectively operative, in that they take part in the rolling process in the direction of the tire tread. If a non-skid member is thus in engagement or operative position, the spikes provided, for example, on the non-skid member or part thereof would become operative so that skidding of the motor vehicle would be at least markedly reduced. When the non-skid means are moved out of the operative into inoperative position, they are no longer in their effective or engagement position and no longer act on or form part of the rolling surface on the road bed. The spikes and the like no longer touch the cover of the road and cannot damage it any more.

If the non-skid member according to the invention is brought, for example, into engagement position, it can be so locked therein as if said member or members form or were a part of the tire tread.

When such member is moved out of engagement position, the member is then fixed in its position as if it were withdrawn, leaving the effectiveness to the thread surface of the tire.

The guide grooves according to the invention may have all the same form or various groups of the grooves may have the same form, or they may assume all different configurations. They can have any geometric cross-section known per se, such as U-, V-, T-form or deviations thereof with or without rounded edges. Other cross-sectional forms are applicable and possible. For example, a semicircle or part circular shape can be selected (up to about three-fourths of a circle). The cross-sectional form can also be partly elliptical, dovetailed and the like. It is also possible to impart to various grooves of the tire different cross-sectional forms.

The bottom portion of the respective guide grooves may deviate completely or partly from the horizontal direction. In this manner inclined or ascending support surfaces are formed along which the non-skid member or members are displaceable and can be activated.

Each bottom portion may present according to the invention at least one striking or effective surface. Such surface need not extend continuously along the same slope, angle or bevel face, which may be varied.

The bottom portion and/or the lateral surface portions defining the groove may be lined with harder and/or greater wear-resistant metallic or non-metallic material, such as carbide compound, and may be vulcanized with the tire material. The hardness or wear-resistance should depend on the rubber material forming the tire tread. Thus, e.g., steel inserts are suggested or rubber or plastic layers are comtemplated.

The non-skid members are preferably shaped to comply with the cross-sectional form of the respective groove. Minor deviations from the configurations as mentioned are possible. The non-skid members or elements are provided on the running side of the tire with skid-reducing means.

In order to permit a positive and better sliding operation for the non-skid members in the grooves, the latter may be provided in the direction of or along the groove bottom and/or on the lateral groove faces with mechanical or other guide means, for example, rollers, "Teflon" coating, and the like.

An essential object of the invention contemplates the fact that the non-skid members are made of a material of the same or of a different composition that the thread material with which such members coact. The non-skid member can thus consist of harder (or softer) and/or greater wear-resistant material than that of the treads. It is even possible that the non-skid body itself consists of metallic material or that metallic material is inserted in said body. The entire non-skid member may be built up as a spike or group of spikes.

Another important object and advantage of the invention is to provide means rendering the possibility to employ mechanical, hydraulic, pneumatic and like force to influence and act on non-skid means per groove via suitable steering or connecting means (such as Bowden cable, steel band and like traction means) in order to bring or move the non-skid member into and out of engagement position relative to the tire tread surface. Naturally other transmission constructions or manipulatable means are employable to operate the non-skid means as herein explained.

The present invention proposes, e.g., a spring loaded Bowden cable (or similar connecting means) to be secured in one embodiment of the invention to an abutment which is located on one side of the shoulder of the felloe or time of tire wheel. On the opposite side of such rim acts then a traction means so that the non-skid member is brought, by pulling on the Bowden cable, into engagement position, while when the traction comes to a stop, a spring force (or any other retraction means) returns the non-skid member or members from the engagement position to an inoperative position (rest).

The mentioned traction means on one side of the wheel rim may preferably comprise a rotable and lockable or adjustable disk which is journaled and mounted relative to a ring element accommodated and secured in the rim. On this disk is secured one end (for example, the unloaded end) of traction means, such as a Bowden cable. When the disk is rotated in one or opposite direction or moved, the core of the traction cable is pulled. a cooperable spring is loaded on the opposite side, and the non-skid member is brought into its operative position. When the disk is rotated back, the spring pulls automatically the non-skid member to a return or into its inoperative position. With the disk may be associated additional auxiliary or adjustment means, particularly locking means and additional springs in order to facilitate disk rotation. On the disk may be provided pins or projections in order to effect adjustments by means of a lever, preferably according to certain markings or notches to ensure a predetermined end position. Partial rotational movements of the disk may be carried out through transmission means of known of different type, for example, controlled from the interior of the car or dashboard via an interposed small motor acting on traction means operatively connected to the non-skid units or means.

The aforesaid and other objects and purposes of the invention will become apparent to persons familiar with the type of equipment herein disclosed upon further studying the following specification and examining the accompanying drawings.

BRIEF DESCRIPTION OF THE DRAWINGS

FIG. 7a–g shows a plurality of cross-sectional forms of grooves.

FIG. 8 is a fragmentary front elevational view illustrating a ring which is secured on a wheel rim and a disk to move the core of a Bowden cable against the force of a spring seen in FIGS. 1 and g in order to move non-skid means into and out of engagement positions.

FIGS. 9 and 10 illustrate further embodiments of the invention, shown in fragmentary and elevational views, respectively, partly in section.

DETAILED DESCRIPTION OF EMBODIMENTS

Figure 1:
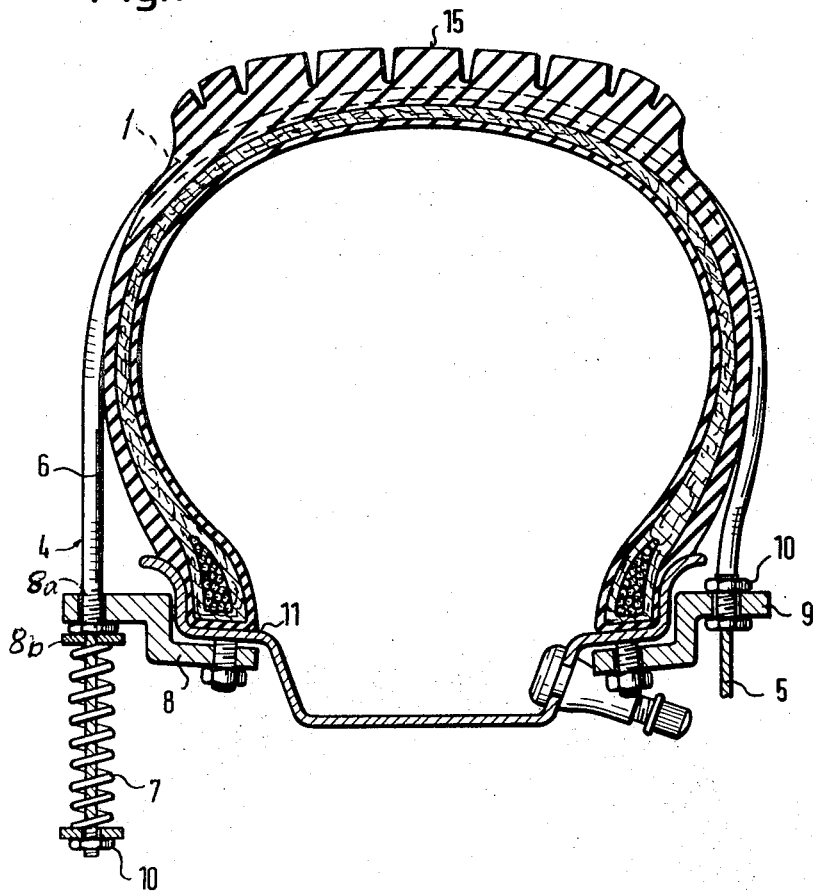
FIG. 1 shows an automobile tire in a section equipped with schematically indicated non-skid means pursuant to the invention.
Figure 2:
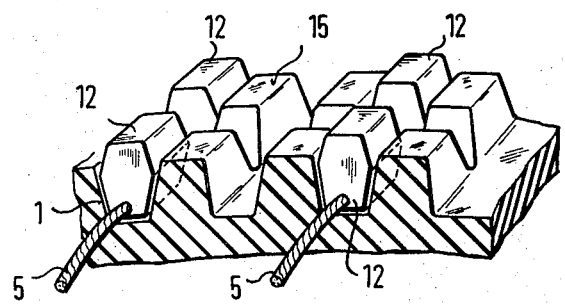
FIG. 2 is a fragmentary perspective view of a tire portion tread surface equipped with non-skid means in accordance with the invention.

Referring now more particularly to the attached drawings there is disclosed in FIG. 1 a cross-section through a tire structure embodying the invention. The tire is mounted on a known wheel rim or felloe 11, to which is joined an abutment piece 8 at a shoulder of rim 11 as shown. At the free end of abutment 8 is a bore 8a with which known fastener means 8b are connected to retain in place a Bowden cable 4, with the interposition of a spring 7, which is supported at 10. The Bowden cable 4 then passes through and along a guide groove 1 (FIGS. 1 and 2) which is again visible and offset on the opposite tire side (right side). Here another abutment 9 is secured in a similar manner on rim shoulder 8, for example, by means of threaded fastener disks, known per se. The core 5 of the Bowden cable projects and can be so pulled or subjected to traction while spring 7 is compressed. Due to this power force the non-skid members 12 are brought into operative position, as will be further described. If the traction on the core 5 is no longer effective, the spring 7 stretches and is released in its action to pull the non-skid member or members 12 to 12c back into their starting position (FIGS. 1–6).

Figure 3:
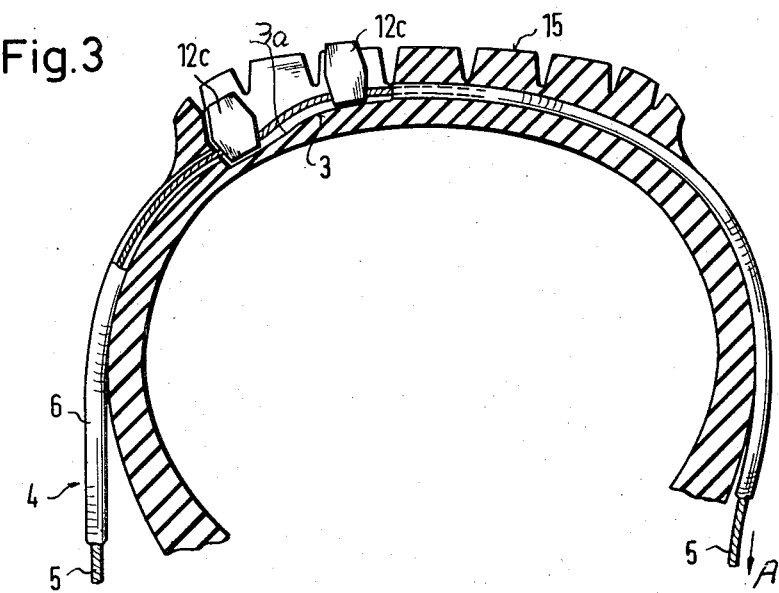
FIG. 3 shows more schematically a section through a tire, similar to FIG. 1, but with non-skid means in operative and inoperative positions.

The mode of operation of the non-skid means is shown in principle in FIG. 3.

On the core 5 of the Bowden or traction cable 4 are secured two non-skid members 12c. If core 5 is pulled at the right (in the direction of arrow A) the two non-skid carriers or members 12c slide along a striking surface at 3a so far in upward direction that they arrive at the level (or above) the tread surface 15. If no traction will be active anymore on core 5 in the direction of the arrow A, spring 7 (FIG. 1) pulls the two non-skid members 12c back into their original or starting position as demonstrated by the left non-skid member 12c. The tire now rolls on its running or tread surface without spikes or like elements.

The number of non-skid members per Bowden cable 4 and per guide groove 1 or 3, 3a may be the same or different. It is well understood that, if desired, at least one non-skid member 12 to 12c may be provided for carrying out the invention. It is possible, however, to arrange a plurality of such non-skid members 12 to 12c.

Figure 4:
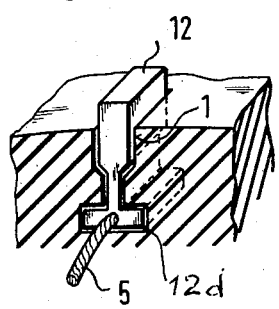
FIGS. 4 to 6 show in perspective and each in section a form of a groove in a tire with non-skid means of various shapes accommodated therein.
Figure 5:
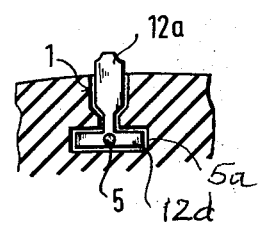
Figure 6:
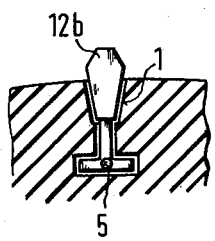

FIGS. 4 to 6 show, respectively, cross-sectional shapes of guide groove 1. The non-skid members 12, 12a, 12b are formed accordingly. They are guided in T-shaped grooves 5a each with correspondingly formed foot 12d.

Other cross-sectional forms of such type of grooves 1 are also shown in FIG. 7, designated a–g. It is also possible to select different cross-sectional forms on one tire or in connection with tires, depending on the result to be achieved.

The form of the non-skid carriers or members themselves may also vary.

FIG. 8 elucidates the principle of an operable adjusting or steering device for displacing non-skid members. The core 5 terminating in FIG. 3, for example, at the right hand side, is secured to a disk component 13. Core 5 passes through a bore 17 of a ring component 14. The ring component 14 is fastened to the rim of the wheel carrying and supporting the tire. When the disk 13 is turned in the direction of the arrow B, the core 5 is pulled and the non-skid members, say 12 to 12c, are displaced into operative position, as seen in FIG. 3. In this operative position disk 13 can be locked in its adjusted position, e.g., by striking against an inclined or bevel surface. If disk 13 is returned to starting location, according to arrow C spring 7 becomes active and causes movement of the non-skid members 12 to 12c again to their inoperative positions, respectively.

Instead of disk 13 other hand- or power-operated means are employable for pulling core 5 and like adjustable connecting means. Disk 13 or like displaceable and operable means with traction means 5 may serve as control and locking means actuatable from the interior of a car or automobile via guide means and control means of the mechanical, hydraulic, pneumatic, electrical and like type.

The invention contemplates also that the casing 6 of the traction means may be vulcanized in the range and below the tread surface of the tire. But instead of the casing 6 it is also possible to vulcanize thereto only a single guideway as means for guiding the core 5. This guideway may have any desired cross-sectional form, such as round, elliptical, etc.

FIG. 9 shows that the spring 7a may be enclosed and vulcanized within a position of the tire; to this end a cavity 18 is provided in the tire in which at least one spring 7a is arranged, which is secured in position by means of a pin or cable cord 19 provided and affixed within the material as anchoring means for spring 7a. This anchor 19 is affixed to the tire material and connected through vulcanization.

Communicating with cavity 18 is a preferably self-contained guide channel or passage 21 in which runs a cable cord 20 operatively connected to spring 7a. On this cord 20 are then secured (as herein described) the non-skid members 12.

This latter arrangement avoids the necessity for the anchorage of springs, as indicated in FIG. 1.

A further preferred embodiment of the invention is shown in FIG. 10, somewhat similar to that of FIG. 3. Only here is shown how the non-skid member 12 can be moved and centered in a recess 22. The guide groove 23 terminates short of the lateral end region of the tire tread surface 15. At this location there is provided a channel- or tunnel-shaped opening 22, so that the tread surface proper remains above the aforesaid lateral opening. Into this tunnel-shaped opening 22 can be slid or entered the non-skid member 12 (from its broken line position) to subseuently assume an effective position (shown in full line). For moving the non-skid member 12 back and forth a pull cord or Bowden cable 20 may be employed. Thus members 12 are lifted and guided above the thread surface 15 along the bevel 24 in tunnel-shaped guide.

The invention further sets forth that the cord or the free end of the operable core 5 may be applied to a drum rotatably mounted on (or near) the axle of the car, to facilitate winding and unwinding the core.

When such drum is rotated — for example, by means of a crank (and preferably with the interposition of speed reducing means) the end of the core, which is secured to the drum, is wound thereon and the non-skid element 12 is subjected to a pulling force or action, as can be gathered from FIG. 10, out of the starting position (shown in a broken line) into an operative position with the element 12 moving beyond bevel 24 to project above the tread surface 15. Traction means 20 could be guided as indicated beforehand, over transmission means, or rollers, guide tubes and the like. When the non-skid element 12 is in operative position, the drum may then be arrested and locked and the manipulator's crank be removed. As locking means may serve known worm and worm wheel arrangements, the non-skid element 12 remaining thus in its operative position. Upon release of the locking means of the drum non-skid element 12 slides back into its rest or inoperative position due to the action of spring 7a.

Preferably a spring is applied to the cord 20 within the range of the winding drum so that the tractive force thus released can be taken over by spring means, when the non-skid element 12 cannot slide for any reason to its inoperative or operative positions. Thus can be the case when the tire is not in motion, stands still and the non-skid element or elements cannot assume the respective positions. When the car is in motion, this spring arrangement ahead of the winding drum, which is preferably secured to traction means 20, will subsequently pull the non-side element into its operative position.

Figure 11:
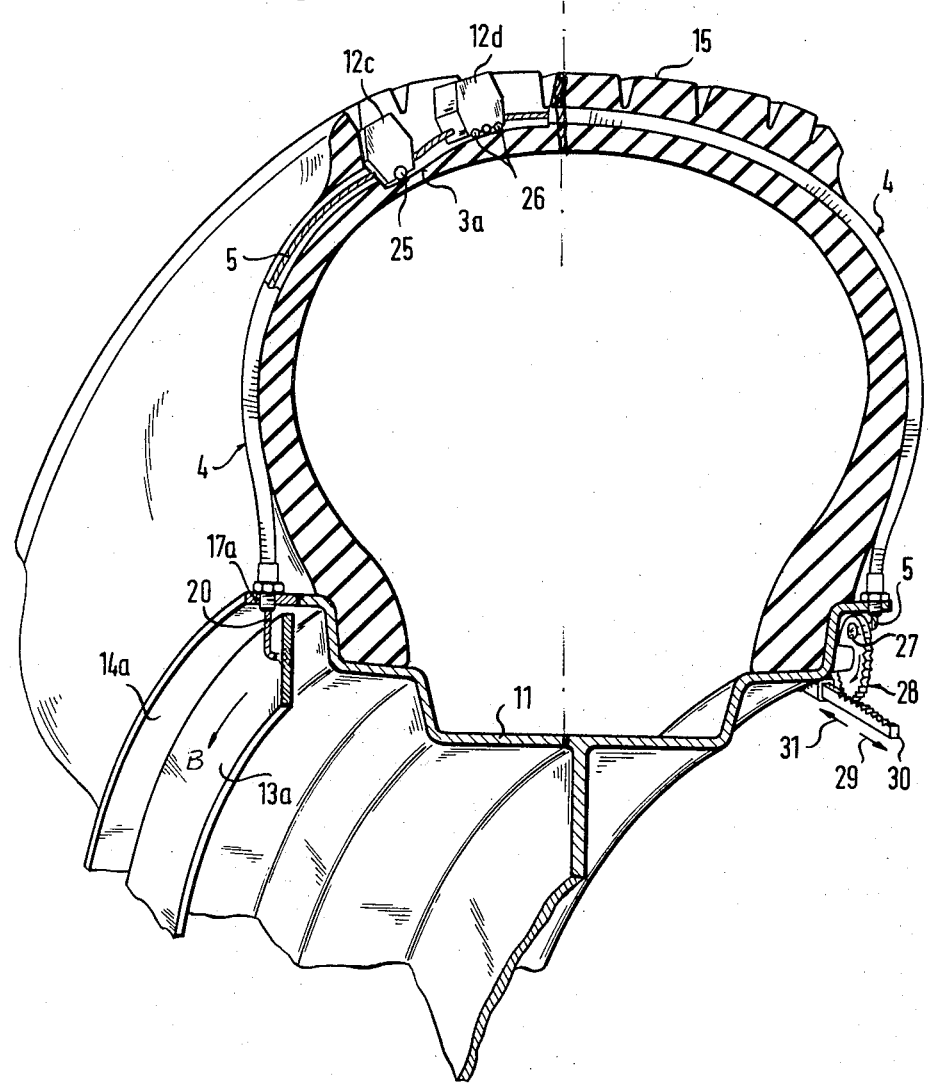
FIG. 11 illustrates a further embodiment of the invention in sectional view.

Referring to FIG. 11 there is shown rim 11 onto which tire 15 is mounted. Bowden cable 4 is shown with core 5 as in the previous figures. Mounted on core 5 are non-skid members 12c and 12d. *Non-skid member 12c* is provided with a roller 25 such as of Teflon and similarly non-skid member 12d is shown having three such rollers 26 (typical). Rollers 25 and 26 facilitate the movement of members 12c and 12d, respectively. Core 5 is mounted to rim shoulder 14a by means of lock nut assembly 17a and the end portion of core 5 disposed below rim shoulder 14a is fixedly secured to disc 13a.

The other end 27 of core 5 is fixedly secured to a rack and pinion assembly 28 in an eccentric manner. Rack portion or gear lever 30 is movable in either the direction of 31 or the direction 39.

Disc 13a is moved in the B direction with such movement being transmitted by rack and pinion 28. When lever 30 is moved in direction 31 non-skid members 12c and 12d are displaced into operative positions. With reverse direction 29 of lever 30 the non-skid members 12c and 12d are again returned to their inoperative positions.

It can thus be seen, that there has been provided according to the invention a non-skid device, which is highly efficient in operation, may be applied to existing tire structures with great ease and convenience, may be incorporated in new tire constructions and offers the particular advantage that it may gradually, as well as suddenly become effective due to the own volition of the driver and in accordance with various and changing driving conditions. Non-skid means may assume any shapes or configurations conditioned on the build-up of the tire treads and can become operable through traction and guide means as herein indicated.

The invention fulfills unusual results by markedly increasing the safety of the operation of the car or automobile, the protection of the surface of autobahns and roads and the ready adaptability of the non-skid means to other prevailing conditions heretofore not comtemplated by the prior art. Details of execution of the anti-slipping system forming the basis of the invention may be modified or altered according to th purpose intended, but without deviating from the principles of the invention and without sacrificing its advantages, the scope of patent protection to be granted being defined by the ensuing claims.

What is claimed is:

1. In a wheel-supported tire structure having a tread surface the combination of non-skid means supported by said tire, with traction means operatively connected to said non-skid means, guide means in communication with said tire tread surface and for orienting said non-skid means relative to said tread surface, said traction means extending into said guide means from therewithout, and operable means for actuating said traction means to contactingly move said non-skid means from a retracted position within said guide means below said tread surface to an operating position within said guide means adjacent said tread surface of the tire and vice versa.

2. In a structure according to claim 1, said operable means being structured to manually adjust said traction means of said non-skid means in predetermined position.

3. In a structure according to claim 1, the configuration of said guide means in cross-section being preselected.

4. In a structure according to claim 3, the cross-sectional shape of said guide means includes at least one inclined wall portion which is offset with respect to the remaining wall defining said guide means.

5. In a structure according to claim 3, the cross-section of said guide means being defined by wall means of greater wear-resistance than the material of the tire tread surface.

6. In a structure according to claim 5, said wall means of said guide means including self-lubricating lining layer of "Teflon" and like plastic coating.

7. In a structure according to claim 1, said non-skid means including hard metal carbide material, which is relatively of greater wear resistance than that of the tire tread surface.

8. In a structure according to claim 1, said traction means including mechanically operated cable means in the form of a Bowden cable, and spring means returning said non-skid means to said retracted position remote from said tread surface upon release of said cable.

9. In a structure according to claim 1, said operable means including a first component to which said traction means is connected, and a second component through which said traction means is guided and which is accommodated in the wheel supporting said tire structure.

10. In a structure according to claim 1, including power transmission means for actuating said traction means and said non-skid means, respectively.

11. A tire structure having a tread surface and equipped with non-skid means, comprising in combination, traction means operatively connected with said non-skid means, guide means supporting said non-skid means and defined by tire wall means along which sliding movement of said non-skid means within said guide means may be carried out from an inoperative position to an operative position with said non-skid means projecting beyond said treat surface, and operable, means associated with said traction means to slidably retract said non-skid means within said guide means to inoperative position below said tread surface.

12. A structure according to claim 11, said guide means and said operable means being recessed in said tire, said guide means accommodating at least a part of said traction means and including an inclined face extension along which said non-skid means may be displaced to operative and inoperative positions, respectively.

13. A structure according to claim 11, said operable means comprising a first component and a second component concentrally disposed with respect to each other and with one component rotably supported relative to the other, said traction means interconnecting said non-skid means via an opening in said other component with the one component, so that upon rotative movement imparted to the one component said traction means causes displacement of said non-skid means toward and away from said tread surface, respectively.

14. A structure according to claim 13, said one component forming a disk rotatable in one or in opposite direction, said other component forming a perforated ring fixed in position in the wheel rim supporting the tire.

15. A structure according to claim 11, said guide means constituting a tunnel-shaped portion of the tire, into which said non-skid means may be either withdrawn or from which said non-skid means may be advanced by said traction means to assume a position relative to the tire tread surface for projection therebeyond.

16. A structure according to claim 11, said non-skid means being spaced from each other and interconnected with each other through said traction means, and friction reducing means in the form of roller means (25, 26) operatively connected to said non-skid means, respectively, to facilitate sliding movement of said non-skid means along said guide means (3a).

17. A structure according to claim 11, one end of said traction means (5) leading from said operable means to said non-skid means, said operable means comprising a disk-shaped element (13a) and a ring-shaped element (14a), one of said elements being movable relative to the other element, said other element having a perforation (at 17a) through which said traction means is threaded and guided to said non-skid means for operating the latter, said one element (13a) of said operable means being rotatably supported by a tire carrier (11), the other element being accommodated in and affixed to said carrier.

18. A structure according to claim 11, one end of said traction means (5) being affixed eccentrically to a portion of a pinion (28) forming part of said operable means and supported for rotation on the tire carrier (11), and a linearly movable gear lever (30) in mesh with said pinion for turning the latter in predetermined direction (29 or 31), thereby to displace said non-skid means via said traction means (5) to operative and inoperative position, respectively.

* * * * *